United States Patent [19]

Utumi

[11] 4,038,442
[45] July 26, 1977

[54] METHOD FOR COATING
[75] Inventor: Tadae Utumi, Minami-ashigara, Japan
[73] Assignee: Fuji Photo Film Co., Ltd., Minami-ashigara, Japan
[21] Appl. No.: 613,829
[22] Filed: Sept. 16, 1975
[51] Int. Cl.² .......................... B05D 5/12; B05D 3/12
[52] U.S. Cl. ..................................... 427/128; 118/407; 118/411; 118/412; 118/415; 427/131; 427/356; 427/357; 427/358
[58] Field of Search ............... 118/407, 411, 412, 415; 427/128, 356, 357, 358, 131

[56] References Cited
U.S. PATENT DOCUMENTS

| | | | |
|---|---|---|---|
| 3,413,143 | 11/1968 | Cameron et al. | 118/411 X |
| 3,496,005 | 2/1970 | Ishiwata et al. | 118/411 X |
| 3,502,494 | 3/1970 | Ishiwata et al. | 118/411 X |
| 3,526,528 | 9/1970 | Takahashi et al. | 118/411 X |
| 3,584,600 | 6/1971 | Ishiwata et al. | 118/411 |
| 3,711,312 | 1/1973 | Yoshida et al. | 118/411 X |
| 3,920,862 | 11/1975 | Damschroder et al. | 427/131 |

Primary Examiner—Michael R. Lusignan
Attorney, Agent, or Firm—Sughrue, Rothwell, Mion, Zinn and Macpeak

[57] ABSTRACT

A method and apparatus for coating thixotropic high viscosity liquid coating compositions on a moving web at a narrow coating in such a manner as to provide a flat coating surface. The apparatus is provided with at least two liquid discharge ports arranged side by side opposite to the moving web so that the liquids are discharged through the ports and the edge of the coating liquid streams meet on the web. The apparatus is further provided with an extrusion type hopper having two slide members of which the tip ends are in the form of a knife edge, the slide members being arranged so that the knife edges are directed inwardly toward each other, at least one partition plate interposed between the slide members so as to equally divide the distance between the internal surfaces of the slide members. The method of this invention is well suited for use in applying a magnetic recording stripe to a motion picture film.

3 Claims, 16 Drawing Figures

 
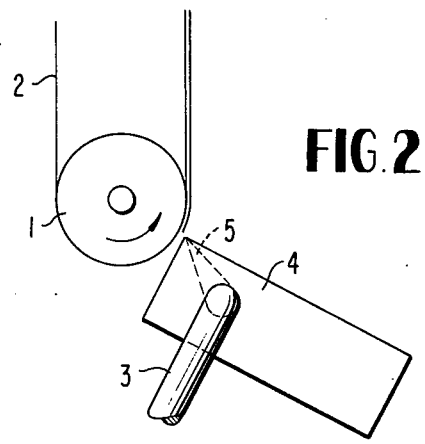
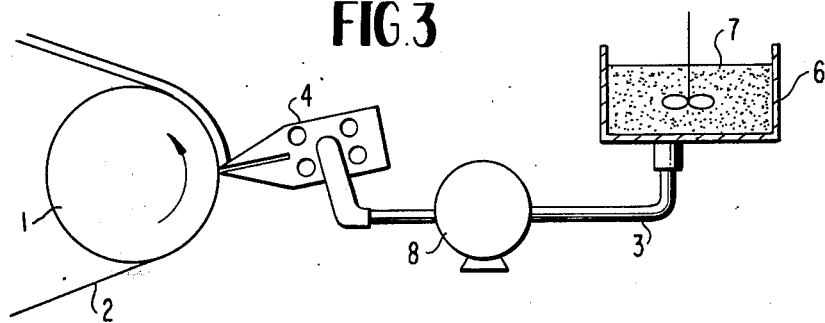
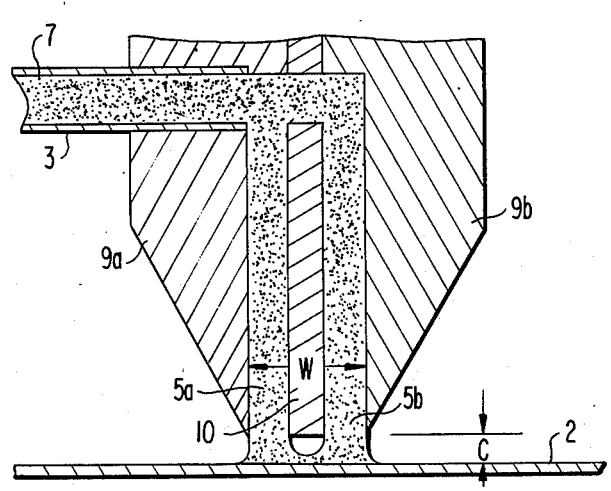

METHOD FOR COATING

BACKGROUND OF THE INVENTION

1. Field of the Invention

This invention relates to a method and apparatus for coating thixotropic high viscosity liquid coating compositions on a moving web at a narrow width through an extrusion type hopper and particularly to a method and apparatus for use in applying a magnetic stripe such as a magnetic sound-recording track to a motion picture film. 2. Description of the Prior Art In the event a magnetic stripe such as a magnetic sound-recording track is applied to a 16 mm or 8 mm motion picture film, the coating thickness must be uniform along the length direction of the stripe, the coating film must not form a zigzag shape, and the coating thickness along the width direction of the web must be uniform, that is, the sectional shape along the width of the film must have a flat surface as shown in FIG. 1 (a). These conditions are necessary for improving the characteristics of the sound quality by enlarging the contact area with a sound-recording head at the time of recording and reproduction.

The formation of a coating using a known device, as disclosed in U.S. Pat, No. 3,062,181 is shown in FIG. 2. In this device, a magnetic coating liquid supplied from a liquid supply pipe 3 is coated by discharging the liquid from a single discharge orifice 5 formed in an extrusion type hopper 4 to a strip of a web 2 moving in the direction of the arrow around a rotating backing roll 1.

In the above described device, however, it is extremely difficult to obtain a coating film having a flat surface as shown in FIG. 1 (a) in the case of application to narrow coating widths and particularly in the case of stripe application for use with a 8 mm motion picture film or an electronic video recording, as described in, for example, U.S. Pat. Nos. 3,354,264, 3,151,215, etc., film in which the width is about 0.7 mm. The narrower the coating film, the greater the surface tension, with the result that the sectional shape of the coating film becomes a semi-circular shape as shown in FIG. 1 (b). The use of the web after coating without any treatment thereof results in a decrease in the contact area of the recording head and a reduction in the sound quality characteristics, and to scattering of magnetic power chipped by a recording head into a recording machine. In such a case as described, therefore, the coated strip is subjected to a surface treatment such as a calender treatment after coating is completed. However, the surface treatment as described is quite cumbersome, results in a loss of magnetic material and is extremely uneconomical due to the necessity of dust disposal.

SUMMARY OF THE INVENTION

Therefore, a primary object of the present invention is to overcome the above disadvantages with respect to prior art techniques by providing a method for coating thixotropic high viscosity liquid coating compositions in a narrow width so that the surface of a coating film is rendered flat.

A further object of this invention is to provide a coating apparatus for conducting the above-described method.

The above described first object of the invention is achieved with an arrangement in which at least two coating liquid discharge ports are arranged side by side opposite a moving web so that the coating liquids are discharged through the ports so that they meet each other on the web.

The above described second object of the invention is achieved with an arrangement such that two slide members, of which the tip ends are in the form of a knife edge, are arranged with the knife edges directed inwardly toward each other, and at least one partition plate is provided between the slide members and an extrusion type hopper which equally divides the distance between the internal surfaces of the slide members.

BRIEF DESCRIPTION OF THE DRAWINGS

FIGS. 1 (a) and (b) illustrate the sectional shapes of a coating film.

FIG. 2 is a view showing a conventional method and apparatus for coating.

FIG. 3 illustrates one embodiment of a coating apparatus according to the present invention.

FIG. 4 illustrates a mode of forming a coating film in one embodiment according to the present invention.

DETAILED DESCRIPTION OF THE INVENTION

Figure 5A:
FIG. 5 (a) through (d) illustrate the changes with time of the coating film in accordance with the present method.
Figure 5B:
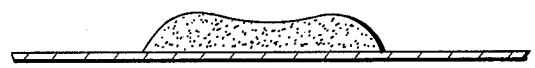
Figure 5C:
Figure 5D:
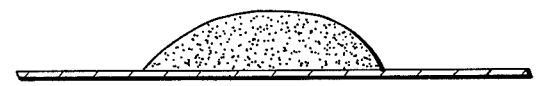

Turning now to FIG. 3, which is a schematic illustration showing one embodiment of a coating apparatus of the present invention, a liquid coating composition 7 within a vessel 6 passes through a distribution pipe 3 and is fed through a liquid feed pump 8 into an extrusion type hopper 4 (hereinafter merely referred to as a "hopper"), after which the liquid is coated on the surface of a strip of a web 2 moving around a backing roll 1. FIG. 4 is a sectional view of the hopper 4 shown in FIG. 3, in which the coating liquid 7 is coated on the web 2 using the hopper 4. In FIG. 4, the coating liquid 7 within the liquid supply pipe 3 is discharged through two discharge ports 5a and 5b formed by a partition plate 10 positioned in the middle portion between knife edge slide members 9a and 9b, and the liquid is then coated on the web 2.

FIG. 5 schematically illustrates the changes in the cross sectional area in the width direction of a coating film coated on the web 2 as the coating.

That is to say, the coating liquid 7 discharged through two discharge ports 5a and 5b shown in FIG. 4 exists initially, on the web 2, in a sectional shape in which the central portion is depressed or concave in form as shown in FIG. 5 (a) due to the action of the surface tension of the coating liquid. This central concave portion is changed into a saddle shape but approaching a flat shape as shown in FIG. 5 (b) as time passes and further changes into an approximately flat shape as shown in FIG. 5 (c). As time further passes, the sectional shape of the coating film is deformed into a semi-circular shape as shown in FIG. 5 (d). In the flat sectional surface as shown in FIG. 5 (c), the contact area of coating with the sound-recording head as previously described with respect to FIG. 1 (a) is greatly increased as compared with the conventional sectional shape as shown in FIG. 1 (b), resulting in a substantial improvement in the sound quality characteristics. As a consequence, if the drying of the coating film is completed by the time that the sectional shape thereof is the flat shape as shown in FIG. 5 (c) to prevent further deformation of the coating film into the semi-circular shape as shown in FIG. 5 (d), a coating with a flat surface is obtained. When this technique is used for coating of a magnetic sound-recording track, the sound quality characteristics can be substantially improved. Since the coating liquid is essentially thixotropic and high viscosity in nature, the above described coating film is deformed very slowly so that the drying conditions can be readily selected, whereby the drying of the coating film is completed when this suitable shape has been achieved. Thus, a coating film with a flat surface can be obtained. It should be noted that while the spacing W between the internal surfaces of the slide members 9a and 9b varies depending upon the characteristics of the coating material, the thickness of the coating desired, the characteristics of the coating liquid and the nature of the surface of the web, W can be selected to be substantially equal to the width of the coating normally desired or slightly smaller than the width of the coating normally desired, in general, 50% or more of the width of the coating desired, particularly around 80% of the width of the coating desired. To improve the precision of the coating width, the tip ends of the slide members 9a and 9b have a knife edge form. The use of knife edge tip ends of the slide members 9a and 9b as described above enables the coating liquid 7 discharged from the discharge ports 5a and 5b to be prevented from running along the tip ends of the slide members 9a and 9b and flowing in the width direction of the coating film, thus preventing changes in the coating width from occurring. The dimension C of the separation distance between the discharge ports 5a, 5b and the web 2 is usually set to be greater than the undried thickness of coating liquid 7 discharged from the discharge ports 5a and 5b, that is, the thickness of the coating film immediately after the discharge of the coating film. In coating a magnetic sound-recording track of a motion picture film, the dimension C will often be selected to be between about 50 $\mu$ and about 200 $\mu$.

The construction of the hopper 4 is described below in detail. FIG. 6 is an exploded view showing the hopper 4 embodying the present invention. FIG. 6 (a) is a front view of slide member 9a, FIG. 6 (b) is a side view thereof, FIG. 6 (c) is a front view of partition plate 10, FIG. 6 (d) is a side view thereof, FIG. 6 (e) is a front view of slide member 9b, and FIG. 6 (f) is a side view thereof. The slide member 9a has a round bore 11a formed in the middle thereof which communicates with the liquid supply pipe 3, and has a groove 12a including the round bore 11a and extended to one end of the slide member 9a. Further, the slide member 9a has one end shaped with an incline to the left and approximately at the groove 12a as shown in FIG. 6 (a), and has knife edges as shown in FIG. 6 (b) in the thickness direction. In FIG. 6 (a), a fixing tapped hole at 13a and a locating pin at 14 are shown. In FIGS. 6 (c) and (d), the partition plate 10 is of the fixed type and is in a plane parallel to the slide members 9a and 9b, and a round hole 11b, a tapped hole 13b and a locating pin hole 14a are positioned corresponding to the round hole 11a, the tapped hole 13a, and locating pin hole 14, respectively. In FIGS. 6 (e) and (f), reference numeral 12b designates a groove formed in a position corresponding to the groove 12a in slide member 9a, numeral 13c designates a tapped hole formed in a position corresponding to the tapped hole 13a, and 14b is a locating pin hole. While the slide members 9a and 9b and the partition plate 10 are shown to be symmetrical with respect to the center line of the grooves 12a and 12b or a line corresponding thereto, thus condition is not always required. If slide members 9a and 9b and partition plate 10 are combined and fixed with the partition plate 10 being interposed therebetween, the tip end thereof is formed into a pyramid shape, at the apex of which two rectangular discharge ports 5a and 5b are formed by the grooves 12a, 12b and the partition plate 10. The coating liquid 7 supplied from the liquid supply pipe 3 to the hopper 4 passes from the round hole 11a to the grooves 12a and 12b and is then discharged through the discharge ports 5a and 5b and coated onto the web 2. Preferably, the depth of the grooves 12a and 12b formed in the slide members 9a and 9b are equal to each other so that the amounts of the coating liquid 7 discharged through the discharge ports 5a and 5b are substantially equal to each other.

Figure 7:
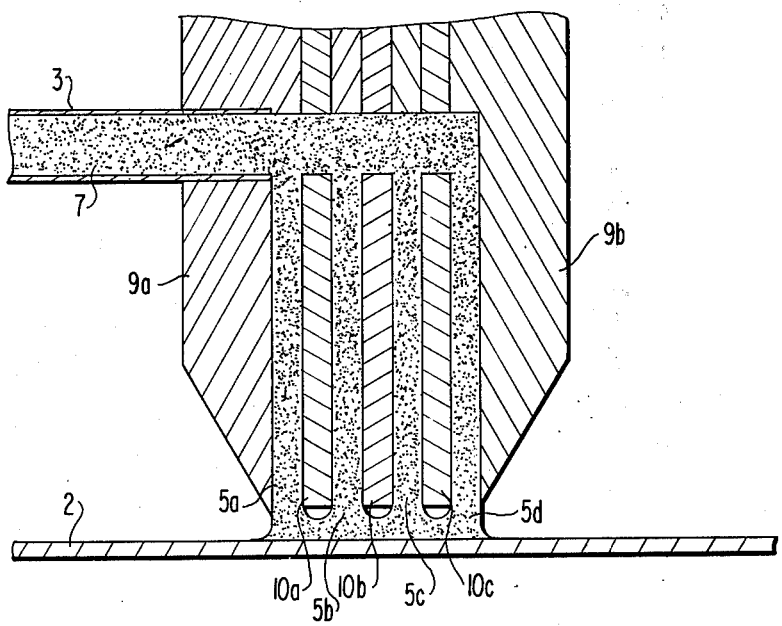
FIG. 7 illustrates a mode of forming a coating film in another embodiment according to the present invention.
Figure 6A:
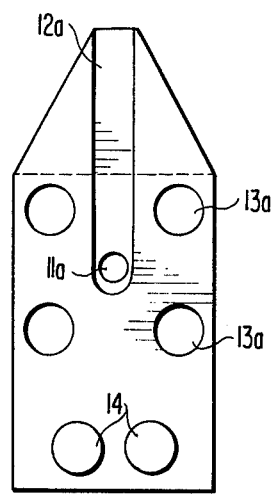
FIGS. 6 (a) through (f) are exploded views showing a hopper in the apparatus for coating in one embodiment according to the present invention
Figure 6B:
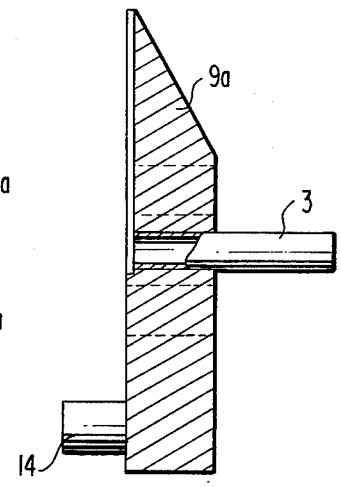
Figure 6C:
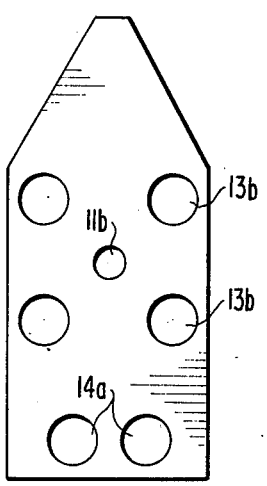
Figure 6D:
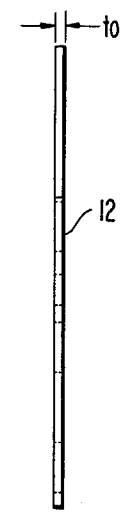
Figure 6E:
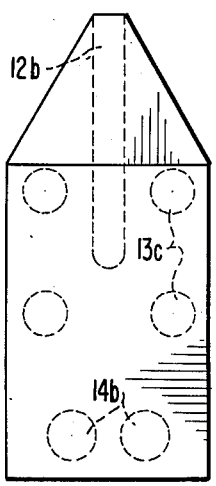
Figure 6F:
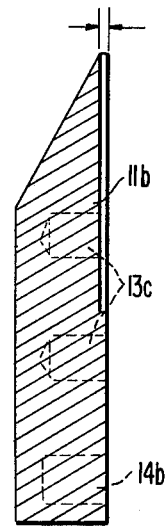

While the preferred embodiments have been described, it is obvious that the present invention is not limited thereto but can be modified in various ways within the scope of the invention. For example, two discharge ports 5a and 5b are provided for the purpose of coating in the embodiments as previously described, but in case of somewhat a wider coating width such as is seen in a 35 mm motion picture film magnetic sound-recording track or a 70 mm motion picture film magnetic sound-recording track, more than two partition plates can be provided between the slide members 9a and 9b to achieve coating using three or more discharge ports, whereby a coating film whose surface is flat can be obtained in a similar manner to the above-described embodiment. FIG. 7 illustrates an embodiment wherein three partition plates 10a, 10b and 10c are provided between the slide members 9a and 9b to form four discharge ports 5a and 5b, 5c and 5d, through which coating is effected. The number of partition plates provided, in other words, the number of discharge ports provided with respect to a predetermined width of coating depends upon the width of the coating, the desired flatness of the surface, the thixotropic characteristics, viscosity and drying conditions of the coating liquid(s) and, the number thereof or the optimum number thereof can easily be determined experimentally.

It will be understood that the coating method and apparatus according to the present invention are not always limited to the application of a magnetic stripe such as a magnetic sound-recording track of a motion picture film, but are applicable to all applications where a coating liquid having thixotropic characteristics and high viscosity is coated in a narrow width and the surface of the coating film must be flat. In such applications as described, a similar effect can also be obtained.

It should be noted that the high viscosity required for the coating liquid in the present invention is about 100 to 8000 cp, preferably 300 to 7000 cp, more preferably 500 to 5000 cp. It should further be noted that the width of the narrow coating is difficult to set forth quantitatively based on the properties of the coating liquids but briefly can include all coating widths approximating a circular sectional shape in the direction of the coating width caused by surface tension in accordance with prior art methods, such as a method involving discharging the coating liquid from a single discharge port.

For other applications, a system is employed wherein a viscous sound developer is coated onto an optical recording system sound track and is then subjected to a developing treatment. The details of thus type of optical recording system are disclosed in Journal of the Society of Motion Picture and Television Engineers, Vol. 77, page 1054 (1968).

According to the present invention, a coating film is obtained in which the surface shape in the width direction is flatter than one obtained by prior art techniques, and if the present method or apparatus is applied to the coating of a magnetic stripe of a magnetic sound-recording track, novel effects are obtained in that the contact area with a recording head is increased and the sound quality characteristics are greatly improved.

While the invention has been described in detail and with reference to specific embodiments thereof, it will be apparent to one skilled in the art that various changes and modifications can be made therein without departing from the spirit and scope thereof.

What is claimed is:

1. A method for coating a thixotropic high viscosity liquid coating composition on a travelling web at a narrow width through an extrusion type hopper, comprising discharging the coating liquid from the hopper onto the travelling web through at least two coating liquid discharge ports arranged side by side in the direction of the width of the web so that the adjacent edges of the coating liquid discharge meet on the web, and drying the coated liquid within such time that a substantially flat cross sectional area results.

2. The method of claim 1, wherein said travelling web is photographic film and said coating composition comprises a magnetic recording layer coating composition.

3. The method of claim 1, wherein the viscosity of the coating layer ranges from about 100 to 8000 cp.

Notice of Adverse Decision in Interference

In Interference No. 100,508, involving Patent No. 4,038,442, T. Utumi, METHOD FOR COATING, final judgment adverse to the patentee was rendered Feb. 5, 1981, as to claims 1-3.

*[Official Gazette June 2, 1981.]*